United States Patent
Rahai et al.

(10) Patent No.: US 12,173,688 B1
(45) Date of Patent: Dec. 24, 2024

(54) OPTIMIZED AIRFOIL WITH CYLINDRICAL LEADING EDGE AND STINGER TRAILING EDGE

(71) Applicants: Hamid R. Rahai, Long Beach, CA (US); Leovigildo Torres, Long Beach, CA (US)

(72) Inventors: Hamid R. Rahai, Long Beach, CA (US); Leovigildo Torres, Long Beach, CA (US)

( * ) Notice: Subject to any disclaimer, the term of this patent is extended or adjusted under 35 U.S.C. 154(b) by 0 days.

(21) Appl. No.: 18/629,875

(22) Filed: Apr. 8, 2024

(51) Int. Cl.
*F03D 3/06* (2006.01)
*F03D 3/00* (2006.01)

(52) U.S. Cl.
CPC ............. *F03D 3/009* (2023.08); *F03D 3/061* (2013.01); *F05B 2240/213* (2013.01)

(58) Field of Classification Search
CPC ............. F03D 3/005–011; F03D 3/061; F05B 2240/211–218
See application file for complete search history.

(56) References Cited

U.S. PATENT DOCUMENTS

| 7,393,177 B2 * | 7/2008 | Rahai ............... F03D 3/061 |
| | | 415/905 |
| 9,494,136 B1 * | 11/2016 | Edmiston ............ F03D 3/005 |
| 10,378,510 B2 * | 8/2019 | Margolis ............ F03D 3/005 |
| 2024/0240610 A1 * | 7/2024 | Gordon ............ F03D 3/0409 |

FOREIGN PATENT DOCUMENTS

DE   102015002435 A1 * 9/2016

* cited by examiner

*Primary Examiner* — Sang K Kim
(74) *Attorney, Agent, or Firm* — Fulwider Patton LLP

(57) ABSTRACT

A high-efficiency airfoil for VAWT is shown to demonstrate an increased power coefficient of higher than 0.4 due to increased lift at lower angle of attacks ("AOA"). The high efficiency airfoil of the present invention includes a modification to the leading and trailing edges, resulting in an improved power coefficient at higher AOAs. For the leading-edge modification, a cylindrical nose was placed at the leading edge, and for the trailing edge a scorpion tail was added to the trailing edge with angles at 20 degrees in either positive (CCW) or negative (CW) direction. The results of these modifications were compared with the corresponding results for the baseline model to illustrate their impacts on the lift and drag coefficients.

5 Claims, 3 Drawing Sheets

OPTIMIZED AIRFOIL WITH CYLINDRICAL LEADING EDGE AND STINGER TRAILING EDGE

BACKGROUND

Vertical axis wind turbines (VAWTs) have a unique design compared to their horizontal axis counterparts. The airfoil shape used in VAWTs plays a crucial role in determining the performance and efficiency of these turbines. Unlike horizontal axis wind turbines (HAWT), the VAWTs can operate in varying wind directions, making their aerodynamics less complex.

The airfoil used in modern VAWTs often incorporates a suitable amount of camber, i.e., the curvature of the airfoil's upper and lower surfaces. Camber helps in generating lift but also contributes to the drag of the airfoil. Thus, shape optimization attempts to determine a balance between lift and drag for efficient energy extraction. Airfoil thickness is another critical parameter that determines the efficiency of the VAWT. Thicker airfoils provide structural advantages, but at a cost of additional weight and drag. In recent years, advancements in materials and manufacturing technologies have further influenced airfoil design. Composite materials and additive manufacturing techniques have enabled the creation of intricate and lightweight airfoil structures, contributing to improved performance.

VAWTs experience a wide range of wind speeds across the rotor, leading to variations in Reynolds numbers, which affects the aerodynamic characteristics of the airfoil. VAWT airfoil design involves considerations for stall conditions, dynamic stall behavior, and the ability to operate over a wide range of angles of attack. Some airfoils are designed to delay stalls, which can be beneficial for VAWTs to maintain lift and power production during varying wind conditions. Advanced parameterization techniques allow for more flexibility in representing airfoil shapes. Modern airfoil optimization takes into account environmental factors, including noise reduction and fuel efficiency. These considerations align with the industry's focus on sustainability and green aviation.

Endplates, also known as shrouds or diffusers, are used in VAWT to enhance their performance by influencing the airflow around the turbine. While HAWTs typically have three blades that capture wind from one direction, VAWTs have blades arranged in a vertical orientation, spinning around a central axis. The endplates serve several purposes in the context of VAWTs. They help increase performance by reducing tip losses (spillage effects), improving pressure difference between pressure and suction zones, reducing wind turbulence by enclosing tips, increasing torque via incoming wind containment, stabilizing rotor motion by acting as a harmonic balancer, optimizing blade loading by guiding incoming airflow, and allowing for enhanced self-starting capabilities by having continued momentum in low-speed regimes. It has been shown that a significant increase in the lift coefficient $C_l$ and decrease of the drag coefficient $C_d$ at lower angles of attack may be achieved with optimized airfoil profile offset-shaped endplates. Investigations show that there is a size limit in the $C_l$ gains for VAWT setup for AoA less than 40 degrees. It has been discovered that values for $C_l$ and $C_d$ for a baseline-optimized airfoil, with and without endplates, show performance increases of 9% in $C_l$ and a decrease of 30% in $C_d$ for the optimized airfoil when using 5-inch offset endplate compared to that without endplates

SUMMARY OF THE INVENTION

The present invention explores geometrical optimization for the development of a high-efficiency airfoil for VAWT that has shown an increased power coefficient of higher than 0.4 due to increased lift at lower angle of attacks ("AOA"). The high efficiency airfoil of the present invention includes a modification to the leading and trailing edges, resulting in an improved power coefficient at higher AOAs. For the leading-edge modification, a cylindrical nose was placed at the leading edge, and for the trailing edge a scorpion tail was added to the trailing edge with angles at 20 degrees in either positive (CCW) or negative (CW) direction. The results of these modifications were compared with the corresponding results for the baseline model to illustrate their impacts on the lift and drag coefficients.

DETAILED DESCRIPTION OF THE PREFERRED EMBODIMENTS

Nomenclature

Figure 1:
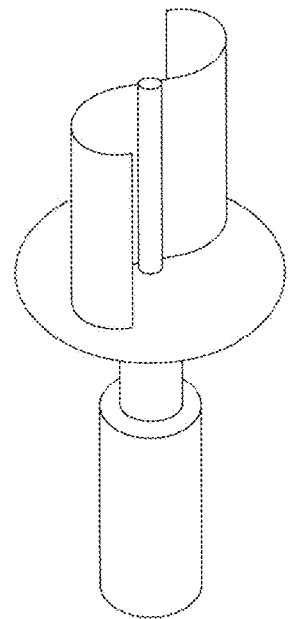
FIG. 1 is an elevated perspective view of a prior art Savonius vertical axis wind turbine.

AoA Angle of attack
D Drag Force (N)
L Lift Force (N)
L/D Lift-to-Drag Ratio
ρ Density (kg/m3)
c Chord Length (m)
S Wing Reference Area (m2)
u Axial Mean Velocity (m/s)
v Vertical Mean Velocity (m/s)
w Transverse Mean Velocity (m/s)
u' Axial Turbulent Velocity (m/s)
v' Vertical Turbulent Velocity (m/s)
w' Transverse Turbulent Velocity (m/s)
U∞ Free Stream Velocity
W Airfoil Width (m)
μ Dynamic Viscosity (N-s/m2)
v Kinematic Viscosity (m2/s)
CD Drag Coefficient, $CD=2D/\rho u2S$
Cl Lift Coefficient, $CL=2L/\rho u2S$
Re Reynolds's Number, $Re=U(0)c/\upsilon$
K Total Kinetic Energy (m2/s2)
ω2 Axial Vorticity (1/s)

The present invention is the result of study and analysis with respect to numerical simulations of an optimized vertical axis wind turbine airfoil with and without endplates using a half-cylinder at the leading edge and a scorpion stinger-shaped trailing edge. The goal of the investigation was to improve the performance of a high-efficiency vertical-axis wind turbine at higher AOA. The investigations were performed at a freestream mean velocity of 10 m/s corresponding to a Reynolds number based on the airfoil chord length of approximately $2.0 \times 10^5$. Four cases were investigated: 1. the baseline airfoil; 2. the baseline airfoil with a round leading edge; 3. Case 2 and a tail at 20 degrees counterclockwise (ccw) angle (positive angle); and 4. Case 2 and a tail at 20 degrees clockwise (cw) angle (negative angle) was investigated. Results showed with the round leading edge the L/D decreases slightly at 0 AOA but increases by 28% at 20 degrees AOA for no endplates and no significant change with endplates as compared with the corresponding values for the baseline model. For cases 3 and 4 at 0 AOA, the corresponding L/D decreased and increased by respectively 28% and 11.5% without endplates and 7% and −15% with endplates. However, at 20 degrees AOA, the L/D values for cases 3 and 4 are increased by respectively 31% and 19.5% without endplates when compared with the L/D of the baseline model. Details of the mean velocity and pressure contours around the airfoil show that with a round leading edge, increasing AOA increases flow acceleration and pressure on respectively suction and pressure surfaces resulting in increased L/D. The stinger tail in an upward or downward configuration could be effective in increasing the L/D if it acts as a compliant tail rotating from negative to positive angles with increasing AOA.

The current studies investigated modifications to the leading and trailing edges of high-efficiency airfoils with and without 5" offset endplates to determine if such modifications result in improving the power coefficient at higher AOAs. For the leading-edge modification, a cylindrical nose is placed at the leading edge, and for the trailing edge the baseline straight tail was replaced with a scorpion tail at angles of 20 degrees in either positive (CCW) or negative (CW) direction relative to the baseline trailing edge.

For the present investigations, the Reynolds averaged Navier-Stokes (RANS) equations with all Y+ wall model and the Spalart-Allmaras Turbulence Model were used with the STAR CCM+ software for all the 3D simulations. A computational volume of 30 D×20 D×18 D based on chord length was utilized. The free-stream mean velocity was 10 m/s. which corresponds to a Reynolds number based on the airfoil chord length of $2 \times 10^5$. A 64-core high-performance computing (HPC) with 256 GB of RAM was used for the simulations. An overset grid mesh was used around the airfoil for changing the AOA from 0 to 20 degrees. A hybrid mesh with an unstructured polyhedral grid away from the airfoil and a structured 15 layers hexahedral grid enclosing the airfoil was used and surface refinement was utilized in leading, and trailing edges and the wake sections to accurately capture the flow characteristics around the airfoil. The minimum prism layer near the airfoil surface was $10^{-5}$ cm and away from the airfoil was 2-3 cm. These values were arrived at after mesh refinements for zero AOA which was updated with changing AOA. The background grid cell count was over 5 million and the overset cell count varied from 10 million to 55 million. The overset mesh count was based on a mesh independence study with the baseline model C_l and C_d as variables of 0.001 asymptotic convergence.

A total of 32 computational study variations were run with CPU times of over 500 hours. A hybrid mesh with an unstructured polyhedral grid away from the airfoil and a structured 15 layers hexahedral overset grid enclosing the airfoil was used and surface refinement was utilized in leading and trailing wake sections to accurately capture the boundary layer and energy dissipation in the wake. The minimum prism layer near the airfoil surface was $10^{-5}$ cm and away from the airfoil was 2-3 cm. These values were arrived at after mesh refinements for zero AOA which was updated with changing AOA. The background grid cell count was over 5 million and the overset cell count varied from 10 million to 55 million. The overset mesh count was based on a mesh independence study with the baseline model C_l and C_d as variables of 0.001 asymptotic convergence. A general acceptance of C_l and C_d variations based on grid size adaptation were set to a 5% improvement over the base model. The L/D changes for 3 designed variations of airfoil leading and trailing edges were compared to the L/D of the baseline model at 0, 5, 10, and 20 AOA with and without the endplates. Contours of the mean velocity and pressure around the airfoils were provided to understand the cause(s) of changes in the corresponding L/D ratios.

For the baseline configuration, flow around the airfoil accelerated on the top for about ¼ of the airfoil chord, and then decelerates over the flat region where a wide and shallow dent exists, before there is flow separation at the tail. There is some flow recirculation in the separation region before it dissipates into the wake. When C_l, C_d and their ratio are compared for all configurations, it was found that adding a half-cylinder shape leading edge to the airfoil profile, at AoA of 0 degrees, the lift-to-drag ratio (L/D) is 1.89, increases to 3.27 for 5-degree AOA, peaking at 3.90 at 10 degrees AOA before decreasing to 3.63 at 20 degrees AOA of 20. Beyond 20 degrees AOA, the L/D decreases having similar characteristics as the baseline model.

For Version 2 (V2), the model with the half-cylinder leading edge and stinger tail-up trailing edge had the best performance in increasing the L/D ratio when compared to the baseline airfoil. There are continuous gains in the L/D ratio for all AOAs, reaching 31% at 20 degrees AoA. Reviewing flow characteristics around the airfoil indicates significant changes in zones 1 and 3 with increased acceleration and narrowing of separation respectively. The lead suction area also experiences increased pressure, resulting in increased lift and reduced drag, thus a higher L/D ratio.

With Version 3 (V3), the model with the round leading edge and the tail down trailing edge, the L/D gained 18% at 20 degrees AoA. When compared to the baseline model, Version 3 contained a 4% gain between 0 to 5 degrees AoA, a loss of nearly 10% between 5-10 degrees AOA mostly related to increased recirculation in zone 2, and then increases in L/D even beyond 20 degrees AoA. The separation in zone 3 is increased resulting in a wider wake and thus a higher drag coefficient. The results of the CL, CD and L/D performance for all variations compared to baseline without endplates are summarized in FIGS. 9-11

Analysis shows L/D gains and losses calculated for AoA=0, 5, 10 and 20 degrees for the baseline model with and without endplates as follows. For no endplates at 0-degree AoA, the lift-to-drag ratio (L/D) is 1.99 while for the baseline with endplates, it increases to 2.33. It then increases to 3.26 (4.76 with endplates) for the 5-degree AOA, peaking at 3.69 (4.85 with endplates) for 10 degrees before decreasing to 2.82 (4.55 with endplates) at an AOA of 20 degrees. The L/D values continue to decrease at AoA>20 degrees until it becomes less than 1.0 and subsequently behaves like a drag mechanism, while with endplates, L/D decreases at a slower rate with reaching a value of 1.0 at AoA of 45-50 degrees.

For all models, Turbulent Kinetic Energy (TKE) exhibited high values in region 1, diminishing downstream. In the separated flow region, TKE is reduced significantly. There is a slight increase in TKE for the baseline model at the trailing edge which could be related to the flow roll-up from the pressure side to the suction side, creating shear in this area and thus a light increased TKE for this region. Examining the mid-section plane, all models display regions of high vorticity at each end with the baseline model having the highest vortices. All other models have lower vortices in these regions with V1 having the least. The vortices are due to discontinuities at the ends and having a half-circular leading edge reduces the strength of these vortices. Adding the tail in either direction causes changes in pressure distributions and the pressure differential between the suction and pressure surfaces, increasing vortices in these areas.

When endplates are added to the airfoil, spanwise flow is constrained, resulting in elevated axial momentum and increased lift. The flow characteristics in the pressure surface regions remain consistent across all scenarios. Notably, the pressure contours exhibit an inverse pattern to the velocity contours, with lower pressure on the upper side and higher pressure below. Compared to the optimized airfoil with no endplates, the introduction of end plates in the design results in areas of lower pressure in the wake due to the flow being kept in the most part, axisymmetric by the endplates, as it traverses around the airfoil, leading to increased velocity and lower pressure on the suction side of the airfoil and reduced pressure in the wake in the recirculation region. There is also an indication of secondary flows at the junction between the endplates and the airfoil.

The mean velocity and pressure distribution contours for a mid-section view for all cases were investigated with endplates at an AOA of 20 degrees. For the baseline model, similar to no-endplate condition, flow around the airfoil accelerates on the top for about ¼ of the airfoil chord (depicted as zone 1), and decelerates over the flat region where a wide and shallow dent exists (depicted as zone 2), before there is flow separation at the tail (depicted as zone 3). There is a clear region of low pressure in the near wake with recirculating flow. With the endplates, for the baseline model at 0 AoA, the L/D is 2.33 increasing to a peak value of 4.85 at AoA 10 degrees, before it reduces to 4.55 at 20 degrees AoA. The slope of the decline is much less than when the endplates were not in place and the extended results indicate the contributions of lift are sustained all the way to 50 degrees AoA.

The investigation further looked at variations of lift and drag coefficients and their ratios for all cases studied with endplates. For V1 at 0 AoA, L/D is 1.70, increasing to 4.65 at 5 degrees AOA, peaking at 4.94 at 10 degrees AoA before decreasing to 4.60 at 20 degrees AoA. For small AOA (<3 degrees), L/D for V1 is less than baseline. However, the variation of L/D for V1 is comparable to those of the baseline model. For V2, as compared to the baseline model, there are about 15% gains in L/D between 10-20 degrees AoA and over 6% gain beyond. However, L/D is reduced for AoA less than 10 degrees which is pronounced for less than 5 degrees AoA, when compared to the corresponding L/D of the baseline model. Variations of mean velocity in zones 1 & 2 are similar to the baseline model, however in zone 3 and beyond, the areas of recirculating flow are increased.

The flow characteristics in zones 1 and 2 are very similar to the corresponding zones in the baseline model. The major changes are in zone 3 where compacted areas of flow separation and re-circulation are observed. The increase in separation has resulted in the loss of L/D of 3% at 0-degree AoA to 15% at 20 degrees AoA, when compared to the corresponding L/D of the baseline model.

For V3, similar flow characteristics as in V2 are observed, except in zone 3, a larger separation and increased recirculation and wake-width are observed. The pressure side experiences a higher pressure, resulting in increased lift when compared with other cases, however, due to increased separation, the drag is also increased significantly, resulting in lower L/Ds at higher AOA angles.

Figure 2:
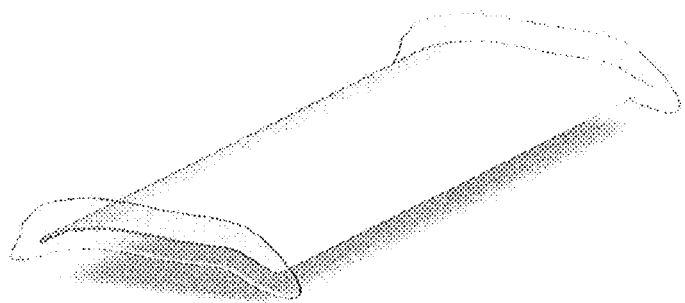
FIG. 2 is an elevated perspective view of a prior art vane for a VAWT.
Figure 3:
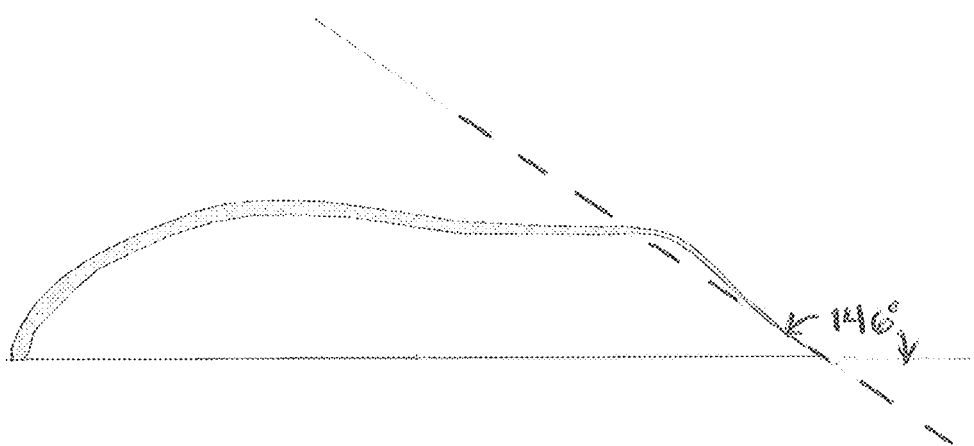
FIG. 3 is a side view cross section (profile) of the prior art vane of FIG. 2

FIG. 1 shows a schematic diagram of a vertical axis wind turbine typically referred to as a Savonius type VAWT. The turbine is shown with two vanes mounted to a vertical shaft that allows the turbine to rotate about the shaft in the presence of wind. The rotation is converted into electrical energy using the generator disposed below the platform on which the turbine rotates. FIG. 2 shows a prior art vane between two end plates, and FIG. 3 shows the cross section, or profile, of the prior art vane. The leading edge approximates a parabolic shape that leads to an undulating profile that extends to a straight portion at the trailing edge, where the straight portion makes approximately a 146° angle with the horizontal.

Figure 4:
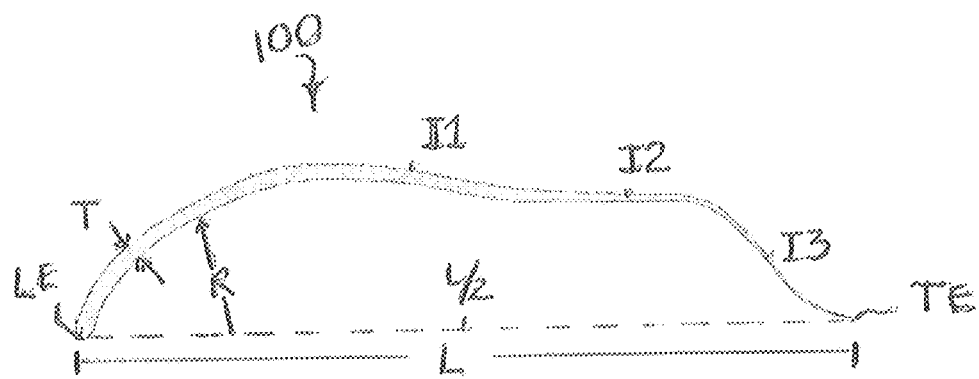
FIG. 4 is a side view cross section of a first embodiment of the present invention.
Figure 5:
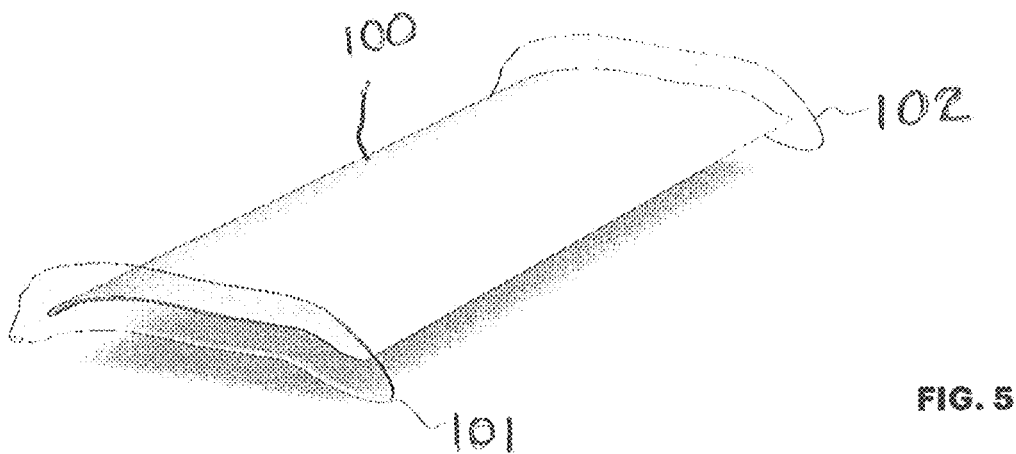
FIG. 5 is an elevated perspective view of the vane of FIG. 4 between two end plates.
Figure 8:
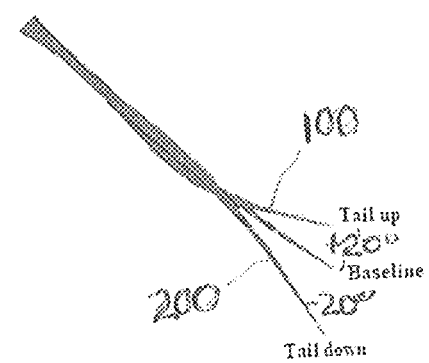
FIG. 8 is an enlarged, overlay of the trailing edges of the vanes of FIGS. 4 and 6 compared with the prior art vane of FIG. 2.

FIG. 4 illustrates a first embodiment a vane 100 for a vertical axis wind turbine of the present invention, where the leading edge has a semi-cylindrical shape of radius R in place of the parabolic shape of FIG. 3. The vane has a chord length L and a maximum thickness T that is not more than, and preferably less than, two percent of the chord length L. The profile of the vane includes at least three inflection points I1, I2, and I3. An inflection point is a location where the second derivative is zero indicating (in most cases) a reversal in the upward/downward curvature of the profile. As shown in FIG. 4, the first inflection point I1 occurs between the leading edge LE and the halfway point, L/2. At this location, the curvature switches from a downward curvature to an upward curvature. The second inflection point I2 occurs after the half way point L/2, wherein the curvature again reverses from a upward curvature to a downward curvature. Approximately half way between the second inflection point I2 and the trailing edge TE is a third inflection point I3, which begins the transition from a downward curvature back to an upward curvature. If one were to draw a straight line through the third inflection point at the slope of the third inflection point, one would see a tail at the trailing edge that is characteristic of the prior art vane of FIG. 3. However, the present invention includes an upward deflected "stinger" tail that is offset from the prior art trailing edge by positive twenty degrees (+20°). FIG. 8 illustrates the deflection of the vane of FIG. 4 compared with the prior art, or baseline, trailing edge. The stinger tail of FIG. 4 makes approximately a 166° angle with the horizontal. FIG. 5 illustrates the vane 100 between two end plates 101, 102, which have been found to increase efficiency of the VAWT.

Figure 6:
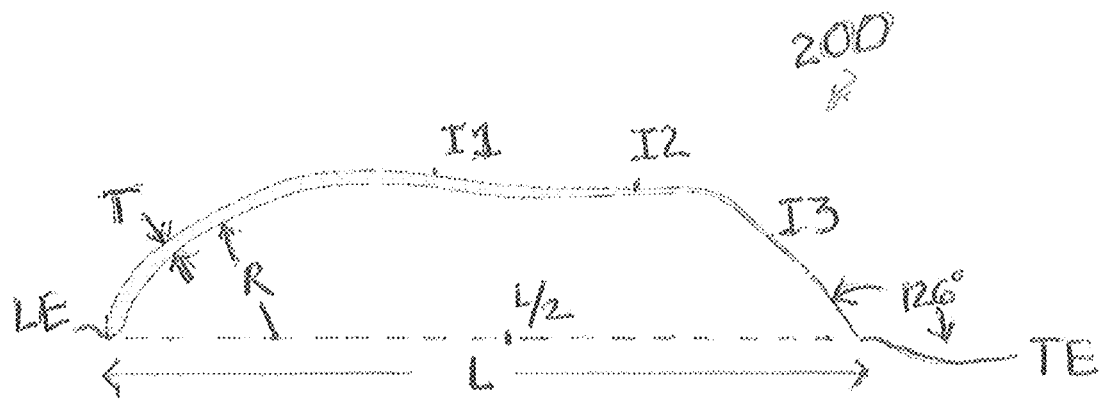
FIG. 6 is a side view cross section of a second embodiment of the present invention.

FIG. 6 illustrates a second embodiment a vane 200 for a vertical axis wind turbine of the present invention, where the leading edge also has a semi-cylindrical shape of radius R. The vane has a chord length L and a maximum thickness T that is not more than, and preferably less than, two percent of the chord length L. The profile of the vane also includes at least three inflection points I1, I2, and I3. As shown in FIG. 6, the first inflection point I1 occurs between the leading edge LE and the halfway point, L/2. At this location, the curvature switches from a downward curvature to an upward curvature. The second inflection point I2 occurs after the half way point L/2, wherein the curvature again reverses from a upward curvature to a downward curvature.

Figure 7:
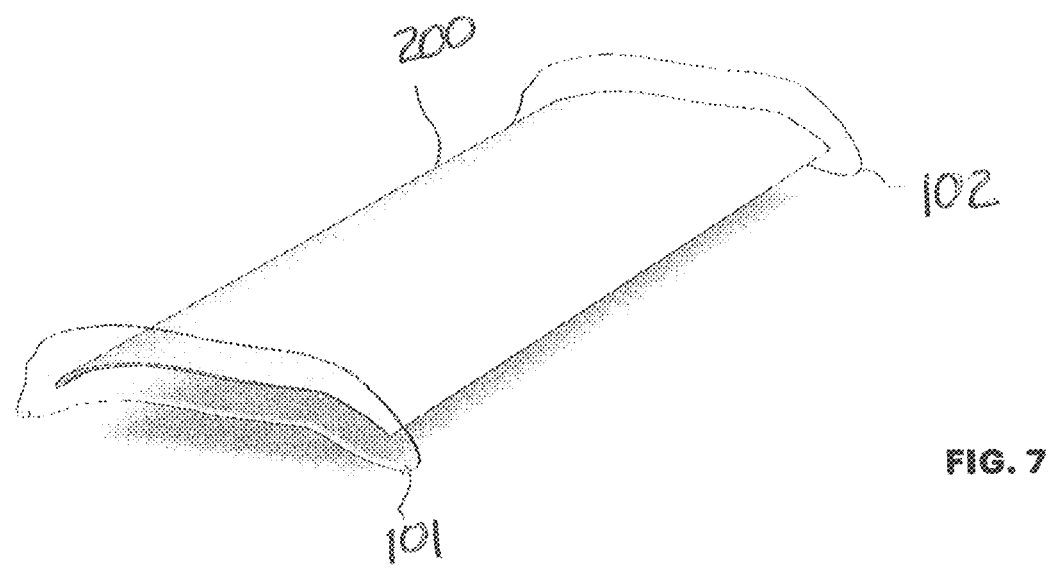
FIG. 7 is an elevated perspective view of the vane of FIG. 6 between two end plates.

Approximately half way between the second inflection point I2 and the trailing edge TE is a third inflection point I3, which begins the transition from a downward curvature back to an upward curvature. If one were to draw a straight line through the third inflection point at the slope of the third inflection point, one would see a tail at the trailing edge that is characteristic of the prior art vane of FIG. 3. In the vane 200, the "stinger" tail is deflected downward from the prior art trailing edge by a negative twenty degrees (−20°) (see FIG. 8). The stinger tail of FIG. 6 makes approximately a 126° angle with the horizontal. FIG. 7 illustrates the vane 200 between two end plates 101, 102.

The goal of the investigation was to improve the performance of a high-efficiency vertical-axis wind turbine at higher AOAs. The investigations were performed at a freestream mean velocity of 10 m/s corresponding to a Reynolds number based on the airfoil chord length of approximately $2.0 \times 10^5$. Four cases were studied: baseline, the round leading edge, and the addition of two variations of the trailing edge with the round leading edge. Details of the mean velocity and pressure contours around the airfoil show that with a round leading edge, increasing AoA increases flow acceleration and pressure on respectively suction and pressure surfaces resulting in increased L/D up to 22%. The stinger tail in a downward or upward configuration could be effective in increasing the L/D if it acts as a compliant tail rotating from negative to positive angles with increasing AOA which improves L/D by up to 18 and 31%, respectfully. We note that the optimized endplates were designed based on the offset contour of the original airfoil. There is better performance of next-gen airfoil without endplates than with them, this may be due to the effect of specific optimized endplates for baseline used in studies. Modifying the geometry of the original airfoil may constitute also having to modify the geometry of the optimized endplates to reflect changes to the airfoil as this may lead to desired effects.

While certain preferred embodiments of the invention have been described and depicted above, the present invention is not limited to only those embodiments described herein. A person of ordinary skill in the art would readily recognize certain modifications and substitutions to the versions of the embodiments, and the invention's scope is intended to include all such modifications and substitutions. Accordingly, the scope of the invention is properly determined by the words of the appended claims using their customary and ordinary meanings, consistent with but not limited by the foregoing descriptions and depictions.

We claim:

1. A vertical axis wind turbine, comprising:
    a plurality of vanes arranged on a platform, each vane defined by:
    a chord having a length L;
    a half-cylindrical leading edge;
    a first inflection point between the leading edge and one half the chord length (L/2);
    a second inflection point between the one half chord length and a trailing edge;
    a third inflection point between the second inflection point and the trailing edge; and
    wherein the trailing edge forms a deflection away from a linear extension of the third inflection point.

2. The vertical axis wind turbine of claim 1, wherein the deflection is at a positive twenty degrees (+20°).

3. The vertical axis wind turbine of claim 1, wherein the deflection is at a negative twenty degrees (−20°).

4. The vertical axis wind turbine of claim 1, further comprising first and second end plates at each vane.

5. The vertical axis wind turbine of claim 1, wherein each vane has a maximum thickness that is less than two percent (2%) of the chord length L.

* * * * *